United States Patent [19]

Levinson

[11] Patent Number: 4,902,327

[45] Date of Patent: Feb. 20, 1990

[54] MONITORING FIBER BEND LOSS CHARACTERISTICS DURING MANUFACTURE

[75] Inventor: Frank H. Levinson, Redwood City, Calif.

[73] Assignee: Raynet Corporation, Menlo Park, Calif.

[21] Appl. No.: 186,521

[22] Filed: Apr. 27, 1988

[51] Int. Cl.⁴ .................. C03B 37/07; C03B 37/02; C03B 37/028; C03B 37/025

[52] U.S. Cl. .................................. 65/13; 65/2; 65/29; 264/1.5; 264/40.2; 264/40.7; 356/73.1; 425/135; 425/174

[58] Field of Search .................. 425/135–145, 425/DIG. 17, DIG. 38, 174.4, 174, 174.6, 171, 172; 264/1.5, 40.2, 40.7; 350/96.15; 356/32, 73.1, 138; 156/64, 378; 73/159, 160; 65/13, 29, 158, 162, 2, 163

[56] References Cited

U.S. PATENT DOCUMENTS

| | | | | |
|---|---|---|---|---|
| 4,081,258 | 3/1978 | Goell et al. | | 356/73.1 |
| 4,163,370 | 8/1979 | Kurth | | 65/13 |
| 4,227,806 | 10/1980 | Watkins | | 356/73.1 |
| 4,236,904 | 12/1980 | Lazay | | 65/13 |
| 4,280,827 | 7/1981 | Murphy et al. | | 356/73.1 |
| 4,343,637 | 8/1982 | Shofner et al. | | 65/29 |
| 4,557,550 | 12/1985 | Beals et al. | | 350/96.16 |
| 4,636,070 | 1/1987 | Ide | | 356/73.1 |

FOREIGN PATENT DOCUMENTS

| | | | | |
|---|---|---|---|---|
| 2382002 | 10/1978 | France | | 264/1.5 |
| 61-47534 | 3/1986 | Japan | | 356/73.1 |

Primary Examiner—Jeffery Thurlow
Assistant Examiner—Mathieu Vargot
Attorney, Agent, or Firm—Dennis E. Kovach; Herbert G. Burkard

[57] ABSTRACT

Forming an optical fiber so as to have a relatively constant bend loss characteristic includes apparatus for continuously bending the optical fiber downstream from a preform from which it is drawn and continuously detecting light withdrawn from the fiber at the bend so created to determine the fiber bend loss characteristic, the fiber bend loss characteristic being maintained constant by using feedback control to vary a drawing speed of the fiber and hence a diameter of a core of the fiber.

15 Claims, 2 Drawing Sheets

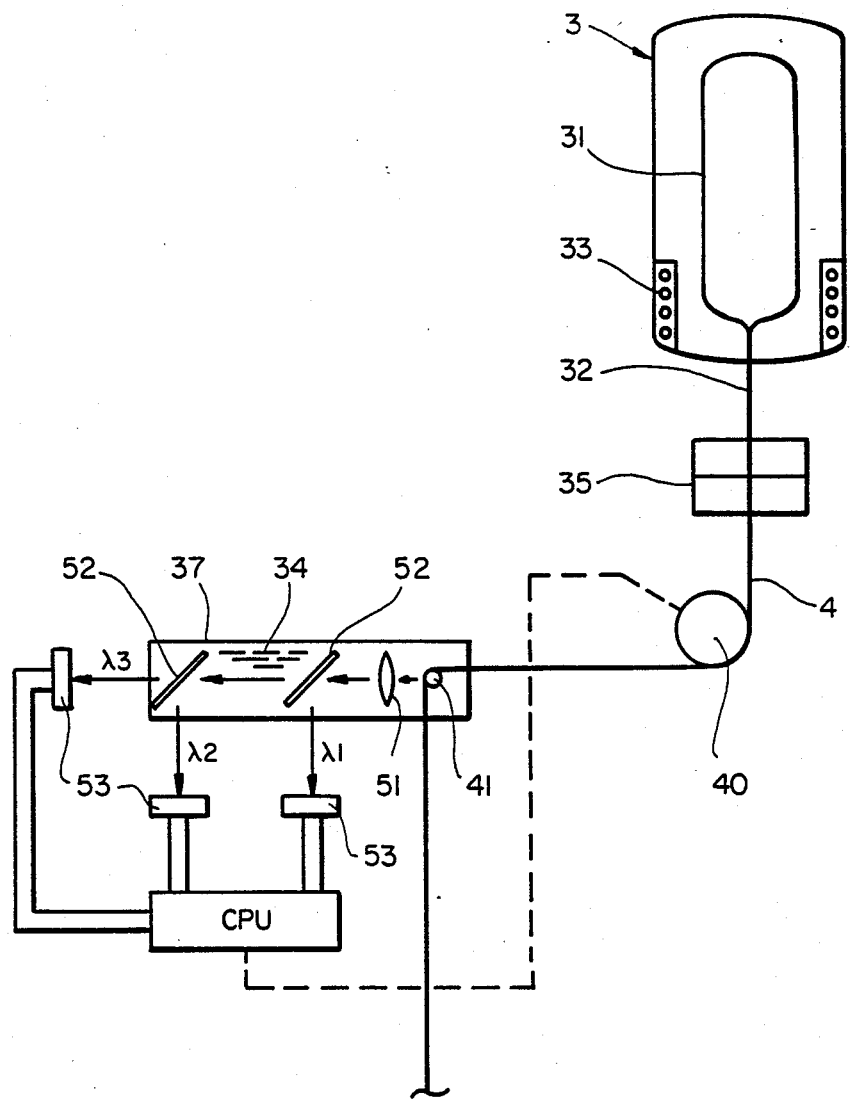
FIG_1

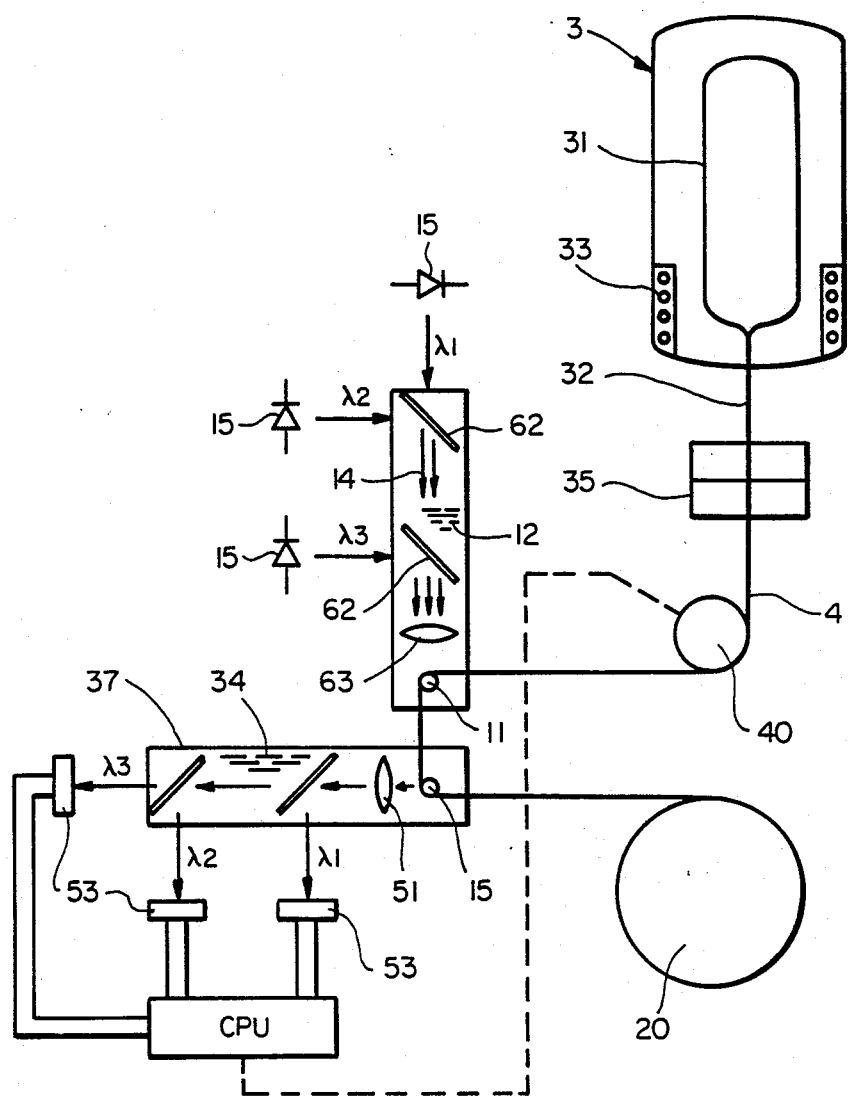
FIG_2

MONITORING FIBER BEND LOSS CHARACTERISTICS DURING MANUFACTURE

BACKGROUND OF THE INVENTION

The present invention relates to a method for manufacturing optical fiber.

Conventionally, an optical fiber is made by first manufacturing a fiber preform, and during this manufacturing process variations occur in the fiber V-number, the V-number being dependent on the fiber core diameter and the fiber delta number, the delta number being indicative of an index of refraction difference between the fiber core and cladding, e.g. $(N_1-N_2)/N_1$. Variations in the V-number, the core diameter and the delta number remain in the fiber when it is drawn to a desired outside diameter, typically 125 microns for telecommunication fiber.

If such a fiber is to be used in a distribution system whereby light is tapped from the fiber by passing the light through a coating (e.g. buffer) of the fiber and into an optical coupler at a bend, the amount of light withdrawn and detected by any given tap varies from fiber to fiber and even along a length of any given fiber since the amount of light withdrawn is dependent on the fiber V-number and other parameters which are not held constant during fiber manufacture. This problem exists principally since a fiber parameter typically held constant is the fiber cladding outside diameter which results in the bend loss characteristic being variable due to variations in the fiber V-number. Tap power variations caused by changing bend loss characteristics require that a receiver for the tap have an unduly large dynamic range and an unduly small sensitivity.

SUMMARY OF THE INVENTION

It is an object of the invention to eliminate the above-noted fiber and fiber tap deficiencies.

Specifically, it is an object of the invention to form an optical fiber having a substantially uniform bend loss characteristic, preferably a predetermined bend loss characteristic, even if this requires the fiber outside diameter to vary.

These and other objects are achieved by a method of making an optical fiber so as to reduce a variation of a bend loss characteristic along a length thereof, comprising the steps of:

monitoring the bend loss characteristic of the optical fiber after it is drawn from a preform as the preform is being drawn; and using feedback control to vary a manner in which remaining fiber is to be drawn from the preform so as to minimize a variation in the bend loss characteristic of the optical fiber thereafter drawn and previously drawn along a length thereof.

The invention will be further understood by reference to the following drawings and descriptions.

BRIEF DESCRIPTION OF THE DRAWINGS

FIGS. 1 and 2 illustrated two preferred embodiments of the invention.

DESCRIPTION OF THE PREFERRED EMBODIMENTS

According to the invention, during the fiber drawing process, the fiber bend loss characteristic is continuously monitored and information derived therefrom is used for feedback control for controlling the drawing process so as to keep the fiber bend loss characteristic substantially constant. An unexpected advantage is that optical fiber can be drawn using such a technique so as to remove optical tolerance deviations that were introduced in previous manufacturing steps, specifically those steps during formation of the fiber preform. The resultant fiber can be placed into premanufactured passive taps, and when connected to the taps will produce predictable tap insertion losses. Passive taps most useful are those described in U.S. Pat. Nos. 4,728,169; 4,741,585; 4,586,783 and in U.S. application Ser. No. 137,317, all assigned to the assignee of the invention, the disclosures of which are incorporated herein by reference.

Conventionally, optical fiber is drawn so as to have precise core and cladding diameters, and care is also taken to insure that a diameter of a buffer of the fiber has a fixed predetermined value. Such fiber is well suited for connectors which require tight tolerances on fiber core and cladding outside diameters, and in fiber installations where these diameters are desired to be known and fixed within tight ranges. However, it has unexpectedly been discovered that precisely controlling the fiber cladding diameter, which is a preferred practice, has a disadvantage in that the fiber bend loss characteristic varies due principly to variations in the fiber V-number.

According to a preferred embodiment of the invention, an outside diameter of the fiber core and cladding is varied as necessary to reduce the fiber V-number tolerance, specifically to change the fiber V-number as necessary to reduce a variation thereof. According to a particularly preferred embodiment, the buffer diameter is maintained constant.

A first preferred embodiment of the invention is to use the "white light spectrum" which is inately in the fiber core because of the drawing process which occurs at 1100° C.

Referring to FIG. 1, an optical fiber preform 31 is drawn into an optical fiber 32 utilizing a heating apparatus 33 in tower 3. The optical fiber is drawn at a temperature of approximately 1100° C. and at this temperature the spectrum of the heat-generated light in the preform will conduct down the fiber core as it is drawn. After it is drawn the fiber is coated at a station 35 by an appropriate high index of refraction polymer to form a fiber buffer, the buffer stripping and dissipating any light which is in the fiber cladding. Accordingly only light in the fiber core is present after 1-2 meters downstream of the coating station 35.

The core light can be bent out of the fiber if the bend radius is sufficiently small (usually <12-15 mm). After the fiber passes a drive roller 40 (which has a large bend radius >100 mm), the fiber passes over a small bend roller 41 which serves to drop a significant amount of optical power carried in the core. A preferred radius of the roller 41 is between 2 and 12 mm, preferably between 2 and 4 mm. Preferably an index matching fluid 34 is contained in contact with the fiber bend by container 37, the fluid being employed to withdraw the core light at the bend. The total power dropped at the bend is preferably measured at several wavelengths (1250, 1300, 1350, 1500, 1550 nm, etc.). As shown in FIG. 1, the light exiting the fiber buffer passes into colimating lens 51 and then through a series of dichroic beamsplitters 52 to separate out the wavelengths, and the power in each of these separate wavelengths is measured by photodiodes 53.

The fiber is not required to have a constant amount of power in its core. All that is required is to have roughly the same relative spectral content in the fiber core at the bend and this is assured by the temperature tolerances of the heating apparatus 33 required to draw quartz fiber. Variances in the absolute optical power drop out as the measurements are differential, e.g. one wavelength versus another.

Differential measurements are adequate and sufficient because the light lost at the bend has the following functional dependence:

$$BL = F(\Delta, a, \lambda, R, \theta) = G(V, W, \lambda, R, \theta)$$

where,
R = bend radius
$\theta$ = bend sector angle
V = fiber "V" number
W = mode field diameter
a = fiber core radius
$\Delta$ = fiber core/clad index of refraction difference
$\lambda$ = wavelength of light.

This mathematical dependence means that if $\Delta$, R, $\theta$ are fixed at certain values and the bend loss is measured at various wavelengths and if it is known, either by empirical measurements or by theory, how a, the core diameter, varies with $\lambda$, then one can determine the value of a by knowing how bend loss varies with $\lambda$. Moreover one can play off the tolerances in $\Delta$ against those controlled in the draw (a) and therefore, within limits, one can make the bend loss more uniform.

The bend loss varies inversely with the V-number, e.g. as the V-number increases towards its maximum of 2.405 (beyond this the fiber is not single mode) the bend loss becomes lower. At a particular wavelength the V-number depends primarily on $\lambda$, a, and $\Delta$. Since a given preform will not have a significant variation in the $\Delta$ parameter over tens of meters (because it is all coming form 1-2 mm of the same preform) then by varying the core radius, a, one can effect changes in the V-number. As the $\Delta$ parameter varies from preform to preform or over longer lengths of the same preform one can decide to fix the bend loss characteristics of the fiber and this translates in a willingness on ones part to vary the core diameter a to achieve this goal since it is the only free parameter. Fortunately it is the only parameter that is accessible for variation during the fibers final stage of fabrication, e.g. during the drawing procedure.

According to a second embodiment of the invention, light to be withdrawn from the fiber for monitoring a bend loss of the fiber is injected into the fiber core upstream of a withdrawal location and downstream from the drawing tower and coating station 35. According to this embodiment, light of several different wavelengths should be injected and be available for detection so that variations in an amount of power injected into the core will not pose a problem.

FIG. 2 illustrates this embodiment. Referring to this figure the optical fiber preform 31 is drawn into the optical fiber 32 utilizing the heating apparatus 33 contained within drawing tower 3, the optical fiber 32 being heated to a temperature and drawn at a speed which result in the optical fiber having an outside diameter approximately equal to a desired value, e.g. 125 microns. Subsequent to drawing the optical fiber, the protective coating layer, e.g. buffer 4, is disposed on the optical fiber exterior at the coating station 35. Thereafter the optical fiber is wound around the roller 40, as in the prior embodiment.

According to this latter embodiment, a second roller 11 is disposed downstream of the first roller 40 and is disposed within an index matching fluid 12. The roller 11 has a radius of curvature sufficiently small so that at least part of an optical signal 14 from a plurality of light sources 15 can be injected into a core of the optical fiber by passing the signal through the fluid, the fiber buffer, and the fiber cladding. Means 62, e.g. half silvered mirrors, for combining the wavelengths from the plurality of sources, are provided upstream of focusing lens 63.

Downstream from the roller 11 the fiber is again wound around a further roller 15 disposed within the index matching fluid 34, the roller 15 having a diameter small enough such that at least part of the optical signal injected at the roller 11 is capable of being withdrawn from the optical fiber by being passed through the fiber cladding, buffer and the fluid 34 and detected by detectors 53. By appropriately monitoring a level of the signals detected, bend loss characteristics of the fiber can be determined as in the FIG. 1 embodiment, e.g. it can be determined whether the fiber is unduly lossy and highly susceptible to losing light at bends or very non-lossy and not being very susceptible to losing light at bends. Accordingly, using feedback control 18, the fiber drawing speed can be adjusted so as to vary the core-cladding diameters and to keep the fiber bend loss characteristics constant.

Though the invention has been described by reference to a few preferred embodiments thereof, the invention should not be limited thereby. Specifically, though fluids 12, 34 are described for optimally aiding light injection and withdrawal, other index matching materials could be used as well, in particular sprays or solids, though care would have to be taken not to unduly restrict movement of the fiber. Finally, the fiber drawing procedure could include other steps as well, such as tensioning steps to ensure the fiber has sufficient strength prior to being wound on a reel 20. Accordingly, the invention is to be limited only by the appended claims.

What is claimed is:

1. An apparatus for forming an optical fiber so as to reduce a variation of a bend loss characteristic along a length thereof, comprising:
    means for drawing an optical fiber from a preform using heat;
    means for monitoring the bend loss characteristic of the fiber after it is drawn from the preform as the preform is being drawn, the monitoring means including means for generating a bend in the drawn fiber having a radius small enough such that light escapes the fiber at the bend, the monitoring means including means for detecting the light escaping the fiber at the bend; and
    means for using feedback control, which has an input connected to an output of the detecting means, to vary a manner in which remaining fiber is to be drawn from the preform so as to minimize the variation in the bend loss characteristics of the optical fiber thereafter drawn and previously drawn along a length thereof.

2. The apparatus of claim 1, the heat used in drawing the fiber from the preform being sufficient so as to generate a white light spectrum in the preform and in the drawn fiber, the monitoring means detecting the white light spectrum within a core of the drawn fiber.

3. The apparatus of claim 2, the spectrum being detected at a plurality of wavelengths.

4. The apparatus of claim 1, a spectrum of light within a core of the drawn fiber being detected at a plurality of wavelengths by the detecting means.

5. The apparatus of claim 1, the radius being less than 12 mm.

6. The apparatus of claim 5, the radius being between 2 mm and 12 mm.

7. The apparatus of claim 5, the radius being between 2 mm and 4 mm.

8. The apparatus of claim 1, the feedback control means monitoring an intensity of light escaping the fiber at the bend as detected by the detecting means.

9. The apparatus of claim 8, the drawn fiber comprising single mode fiber.

10. The apparatus of claim 8, a fiber core radius of the fiber being drawn being varied so as to accurately control the bend loss characteristics of the fiber about a bend radius less than 12 mm.

11. The apparatus of claim 1, further comprising at least one light source, second means for bending the optical fiber about a second radius small enough such that light can be injected into the fiber thereat, the second bending means being located upstream of the fiber bend where light escapes.

12. The apparatus of claim 11, further comprising means for generating a plurality of light wavelengths and multiplexing the plurality of generated light wavelengths and directing them toward a second fiber bend formed by the second means so as to be injected into the drawn fiber.

13. The apparatus of claim 1, further comprising means for disposing a buffer onto the drawn fiber, the buffer disposing means being disposed at least one meter upstream of the bend generating means.

14. The apparatus of claim 1, the monitoring means further including an optical coupler which contacts a fiber coating at the fiber bend for enhancing light escaping the fiber at the bend.

15. The apparatus of claim 14, the optical coupler comprising a liquid.

* * * * *